(12) United States Patent
Lynch

(10) Patent No.: US 7,511,761 B2
(45) Date of Patent: Mar. 31, 2009

(54) CLOSE CAPTIONING SYSTEM IN WINDOWS BASED GRAPHICS SYSTEM

(75) Inventor: David Johnston Lynch, Carmel, IN (US)

(73) Assignee: Thomson Licensing, Boulogne Billancourt (FR)

( * ) Notice: Subject to any disclaimer, the term of this patent is extended or adjusted under 35 U.S.C. 154(b) by 504 days.

(21) Appl. No.: 10/514,227

(22) PCT Filed: May 15, 2003

(86) PCT No.: PCT/US03/15579

§ 371 (c)(1),
(2), (4) Date: Nov. 12, 2004

(87) PCT Pub. No.: WO03/098925

PCT Pub. Date: Nov. 27, 2003

(65) Prior Publication Data

US 2005/0225674 A1    Oct. 13, 2005

Related U.S. Application Data

(60) Provisional application No. 60/380,635, filed on May 15, 2002.

(51) Int. Cl.
*H04N 7/08* (2006.01)
*H04N 5/445* (2006.01)
*H04N 9/74* (2006.01)

(52) U.S. Cl. .................. 348/468; 348/564; 348/589

(58) Field of Classification Search ................ 348/468, 348/465, 564, 589, 600, 239; 345/471, 636; 328/301; 725/137
See application file for complete search history.

(56) References Cited

U.S. PATENT DOCUMENTS 4,439,761 A * 3/1984 Fleming et al. ............. 345/553

(Continued)

FOREIGN PATENT DOCUMENTS

EP           0567344          10/1993
WO        WO 01/95617        12/2001

OTHER PUBLICATIONS

Patent Abstracts of Japan, vol. 015, No. 247, Jun. 25, 1991 & JP 03-078866 (Matsushita Electric Ind. Co. Ltd.).

(Continued)

*Primary Examiner*—Victor R Kostak
(74) *Attorney, Agent, or Firm*—Robert D. Shedd; Joseph J. Opalach; Brian J. Cromarty

(57) ABSTRACT

A method and apparatus for correcting distortion of characters included in an auxiliary data signal received with a video signal. The distortion is corrected by generating a signal representing a background and foreground of both a first character and a second subsequent character. The background and foreground of the first and subsequent adjacent character are then rendered. It is then determined whether the first character is rendered in italics. If so, a foreground color of the first character is re-rendered. Additionally, where a replacement character is received for the first character, it is determined whether the first character is rendered in italics. If so, the foreground and background color of at least a portion of the second subsequent character is re-rendered. A signal representing a background and foreground of a replacement character is generated. The foreground color and the background color of a replacement character superimposing the first character is then rendered.

15 Claims, 6 Drawing Sheets

U.S. PATENT DOCUMENTS

| | | | | |
|---|---|---|---|---|
| 5,036,394 A | * | 7/1991 | Morii et al. | 348/468 |
| 5,181,113 A | * | 1/1993 | Chang | 348/468 |
| 5,283,647 A | * | 2/1994 | Seo | 348/468 |
| 5,375,160 A | * | 12/1994 | Guidon et al. | 379/52 |
| 5,467,142 A | * | 11/1995 | Ichinokawa | 348/556 |
| 5,477,274 A | * | 12/1995 | Akiyoshi et al. | 348/468 |
| 5,572,260 A | * | 11/1996 | Onishi et al. | 348/460 |
| 5,627,594 A | * | 5/1997 | van Gestel | 348/468 |
| 5,742,352 A | * | 4/1998 | Tsukagoshi | 348/468 |
| 5,805,153 A | * | 9/1998 | Nielsen | 725/37 |
| 6,195,078 B1 | * | 2/2001 | Dinwiddie et al. | 345/636 |
| 6,373,526 B1 | * | 4/2002 | Kessler et al. | 348/468 |
| 6,630,966 B1 | * | 10/2003 | Tournier | 348/468 |
| 6,707,504 B2 | * | 3/2004 | Chung | 348/569 |
| 6,817,027 B1 | * | 11/2004 | Curreri | 725/28 |
| 6,885,406 B2 | * | 4/2005 | Yui et al. | 348/564 |
| RE39,003 E | * | 3/2006 | Orr et al. | 348/564 |
| 7,165,264 B1 | * | 1/2007 | Westrick | 725/40 |
| 7,197,715 B1 | * | 3/2007 | Valeria | 715/747 |
| 2002/0075408 A1 | * | 6/2002 | Curreri | 348/569 |
| 2003/0110450 A1 | * | 6/2003 | Sakai | 715/529 |
| 2003/0227565 A1 | * | 12/2003 | Hamilton et al. | 348/468 |

OTHER PUBLICATIONS

Patent Abstracts of Japan, vol. 1999, No. 13, Nov. 30, 1999 & JP 11-212533 (Matsushita Electric Ind Co. Ltd).

Patent Abstracts of Japan, vol. 1999, No. 13, Nov. 30, 1999 & JP 11-219242 (Hitachi Ltd).

Patent Abstracts of Japan, vol. 014, No. 298, Jun. 27, 1990 & JP 02-093587 (Hitachi Ltd).

Joseph D. Becker "Multilingual Word Processing", Scientific American, Jul. 1984, pp. 96-107.

Search Report Dated Aug. 21, 2003.

* cited by examiner

CLOSE CAPTIONING SYSTEM IN WINDOWS BASED GRAPHICS SYSTEM

RELATED APPLICATIONS

This application claims the benefit, under 35 U.S.C. § 365 of International Application PCT/US03/15579, filed May 15, 2003, which was published in accordance with PCT Article 21(2) on Nov. 27, 2003 in English and which claims the benefit of U.S. provisional patent application No. 60/380,635, filed May 15, 2002.

BACKGROUND OF THE INVENTION

1. Field of the Invention

The invention involves processing auxiliary information, such as closed caption character information, in video signal processing systems and, more particularly, to a system for preventing and/or correcting distortion of the rendering of one character that results from an attribute or format, such as italics, of another character.

2. Description of the Prior Art

User interface (UI) systems based on Microsoft Windows 32 bit platform architecture (Win32), e.g., Microsoft Windows Compact Edition (WinCE) operating system for handheld devices, implement a font system and text drawing routines that are designed to print out strings of characters. Examples of systems requiring this type of character generation capability are video signal processing systems that include auxiliary information processing capability, e.g., teletext systems and/or closed captioning systems such as those processing auxiliary information in accordance with the EIA-608 and/or EIA-708 standards. The EIA-608 standard is the broadcast video format used in television sets built in accordance with standards set by National Television Standards Committee (NTSC), which defines a video screen having a 4:3 aspect ratio. The EIA-708 standard is the standard for digital television (DTV) captioning. DTV offers a dramatically higher-quality picture, and provides a display in a wider 16:9 aspect ratio format, e.g., as seen in a movie theater. EIA stands for Electronic Industries Alliance—a trade organization alliance of the US electronics industry.

Closed captioning that complies with the above referenced standards provides characters for display that appear to be superimposed, or on top of, a video image. The characters provide textual content corresponding to the audio portion of a video program, e.g., to aid hearing impaired users. For analog television signals, such as NTSC, the standard television signal in the United States, the strings of text data are present in the vertical blanking intervals. That data is extracted and converted to character data for display on a screen at the same time as the video data is being processed. In digital television signals, the captioning data may be included as a particular group or stream of digital data packets.

Regardless of the signal type or data-delivery means, the closed caption data is used to produce close captioning characters having a foreground and a background color. In addition to the color characteristics, the characters can be stylized or have attributes or a particular format, such as being italicized. Italics is a particular way of formatting characters, for example, tilting the character to the right. The captioning characters are received one at a time for display one at a time using the graphics display capability of the operating system, e.g., Windows text drawing routines. Close captioning systems process characters one at a time to provide increased performance as no assembly of strings of characters is required. Consecutive characters are displayed one at a time on a display.

When the above described systems generate an italicized or tilted character for display, adding the italicized attribute or format to a normal character can cause the italicized character to shift or increase in width and occupy more display area than allotted for display of one character. That is, when italicized, a character can extend into and overlap the space or cell allotted for the adjacent character. Thus, an attribute or format of one character can interfere with the rendering of another character, e.g., adjacent character, and distort or corrupt the rendering of the other character. For example, since the characters are drawn or rendered one at a time, drawing the next character with the appropriate background color can cause at least a portion of the character in the previous character cell or space to be cut-off or clipped. As a result, the character display may appear distorted.

SUMMARY OF THE INVENTION

The present invention involves, in part, recognizing the described problems and, in part, providing a system and method for solving the described problems. An aspect of the invention involves a method of processing auxiliary information included in a video signal comprising the steps of processing the auxiliary information to produce character data comprising data representing a first character and a second character; rendering the first character and the second character in response to the character data; determining if the first character exhibits a predetermined format; and re-rendering a portion of one of the first character and the second character in response to the first character exhibiting the predetermined format. Another aspect of the invention involves a system and method comprising providing a signal indicative of the background and foreground colors of a next character to be displayed and then providing only the foreground color of the adjacent preceding character. Such is performed upon determining the preceding adjacent character is rendered in an italicized form. Another aspect of the invention involves a system and method for replacing a previously rendered character. First, the invention generates a signal indicative of and re-renders the foreground and background colors of the adjacent character rendered after the character to be replaced. Preferably, only an adjoining portion of the adjacent character is re-rendered. Then, a signal indicative of the background and foreground colors of a new character is generated and the background and foreground colors of the new character are rendered in a position on the display screen where the character to be replaced was previously displayed. If the italicized character immediately preceding the newly replaced character is obscured, the previous method for correcting distortion is utilized to correct the text.

BRIEF DESCRIPTION OF THE DRAWINGS

In order that the invention may be more fully understood; it will now be described, by way of example, with reference to the accompanying drawings in which.

DETAILED DESCRIPTION OF THE PREFERRED EMBODIMENT

The inventive system is implemented in character rendering devices able to receive auxiliary data signals for display. The devices may take the configuration of any set top box, computer ranging from mainframes and personal computers (PCs) to digital telephones, hand held devices, e.g., Palm Pilot™ and television signal processing systems (e.g., television signal receivers that either include a display device (e.g., a TV set) or do not include a display device (e.g., a set top box, VCR, etc.). This application discloses exemplary embodiments that involve use of the inventive system and method in processing closed caption data. However, the present system and method is applicable for any auxiliary information including character data received by the device. Other examples of such auxiliary information include teletext data, Gemstar data, etc. Furthermore, the present system may include a display device or generate signals which may be provided to a display device.

Figure 1:
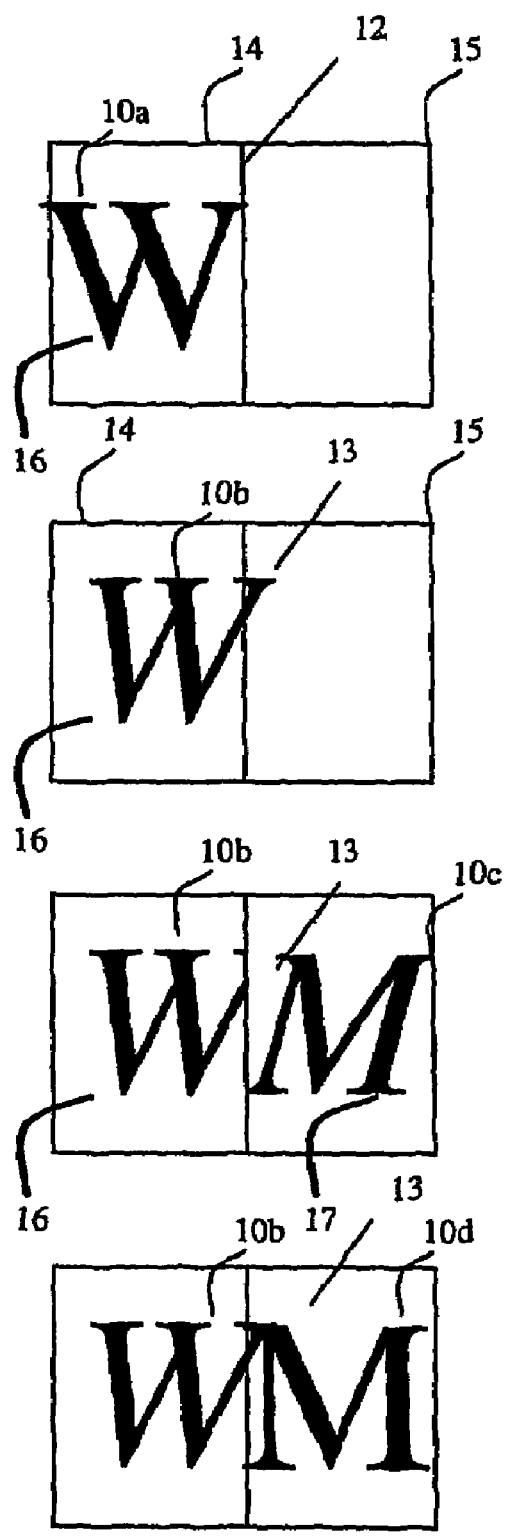
FIG. 1 is a block diagram showing the progression of correcting distortions of a display of close caption text caused by rendering of italicized characters using the system and method of the present invention.

FIG. 1 shows a progression of the present system and method for correcting distortion in a close captioning character 10a positioned within a character cell 14 having a cell area indicated by a borderline 12. In the Figures, the characters 10a-10c and the background of the cell area 16 are shown in black and white, however, Win32 graphics and fonts as well as other graphics and processing software programs may render both the foreground and background in numerous other colors. The cell area 16 behind the character 10a would typically be filled by a background color. When character 10a is rendered in italicized form, shown as character 10b, at least a portion 13 of the character foreground color, i.e., the letter 10b, extends beyond the cell area 14 into an adjacent cell area 15. That is, the format of the first character, i.e., italics of 10b, causes the first character to interact or interfere with the space occupied by the second character, 10c. As a result, the rendering of the second character subsequent to the rendering of the first character causes a disruption or corruption of the first character. As described herein, this corruption is eliminated by re-rendering of a portion of the first character, e.g., a foreground portion, in response to determining that the first character has a predetermined format, e.g., italics. In practice, many italicized characters produce a graphic that extends or bends the character over into the adjacent cell area 15.

The present disclosure refers to italicized characters, indicating tilting of a character to the right. It should be understood that the invention is directed to correcting distortions created by any manipulation of the printed character causing the character to extend beyond its cell area and occupy portions of the cell area of adjacent characters. The direction of the tilt is not significant and the reference to the character as italicized is not significant.

Because characters are rendered or displayed one at a time, rendering of the second character 10c, without regard to the extension 13 of character 10b causes the background and/or foreground color of the second character 10c to cover and thereby cut off the protruding portion 13 of the first character 10b extending or protruding into the cell area 15 of the second character 10c.

Assuming that the italicized character 10b extends beyond the allotted cell area 14 into the second character cell area 15, when the second or next character 10c is rendered having a background color 17 in the cell area 15, the background color 17 of the character 10c will overwrite the protruding part 13 of the previous italicized character 10b. Furthermore, in situations where the background color 17 is not used, obfuscation of the protruding section 13 of the character 10b may occur when the italicized or tilted character 10b protruding out of the allotted cell area 14 is followed by a normal not tilted character 10d.

In order to correct or properly display the italicized character 10b it is not practical to re-render all text for real-time on-line systems such as close captioning. This is because of the real-time requirements of characters being received and displayed. In real-time systems there is simply not enough time to fix all the errors, misprints, or distortions of the displayed text. Thus, an embodiment of the system and method of the present invention comprises generating a signal indicative of and re-rendering only the foreground of the italicized character 10b after rendering of the foreground and background of the next adjacent character 10c to produce the result shown in FIG. 1.

Re-Rendering the Character without Replacing the Background

Figure 2:
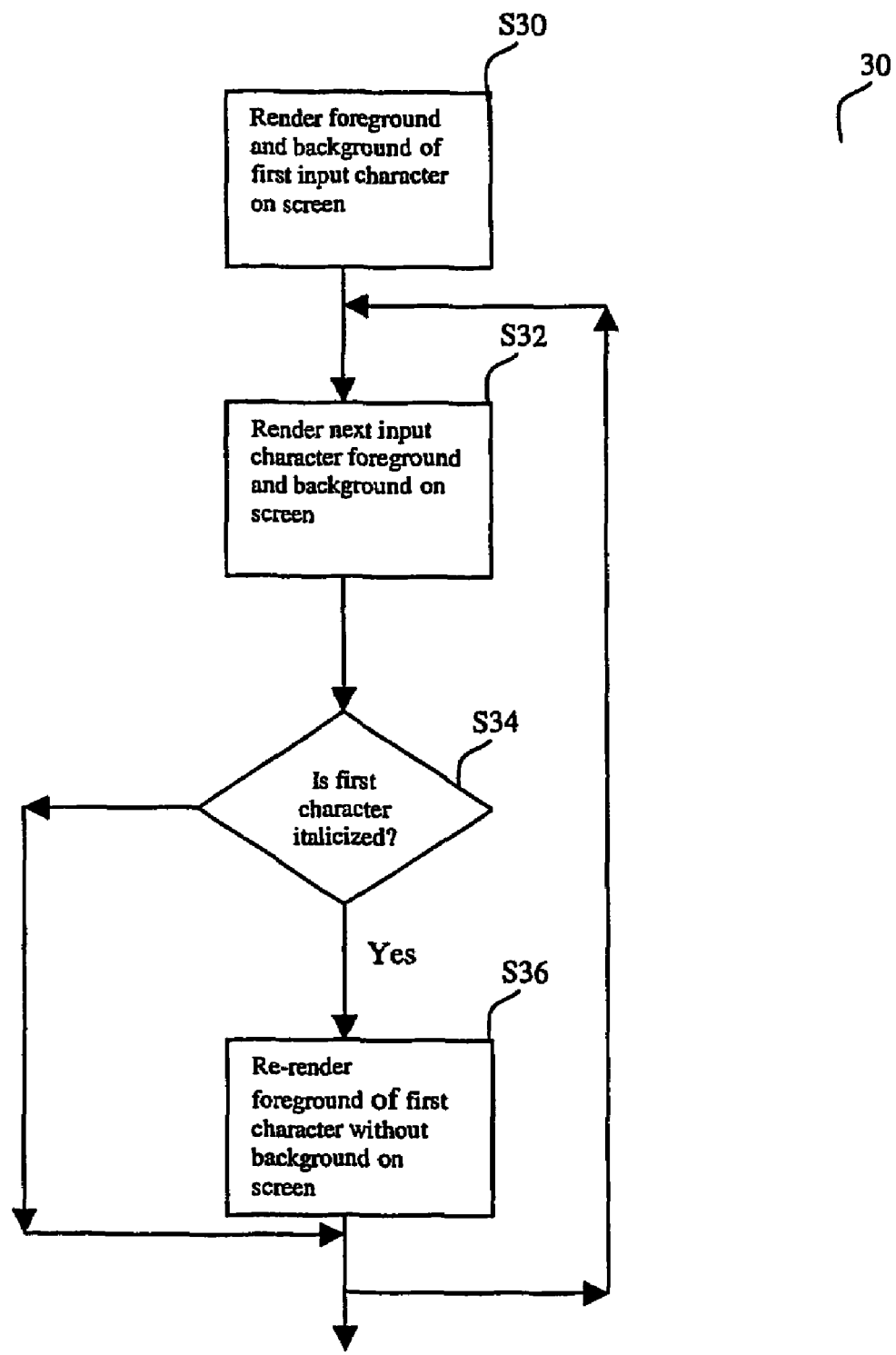
FIG. 2 is a flowchart describing the steps for correcting distortions in close caption text caused by italicized characters in accordance with the system and method of the present invention.
Figure 3:
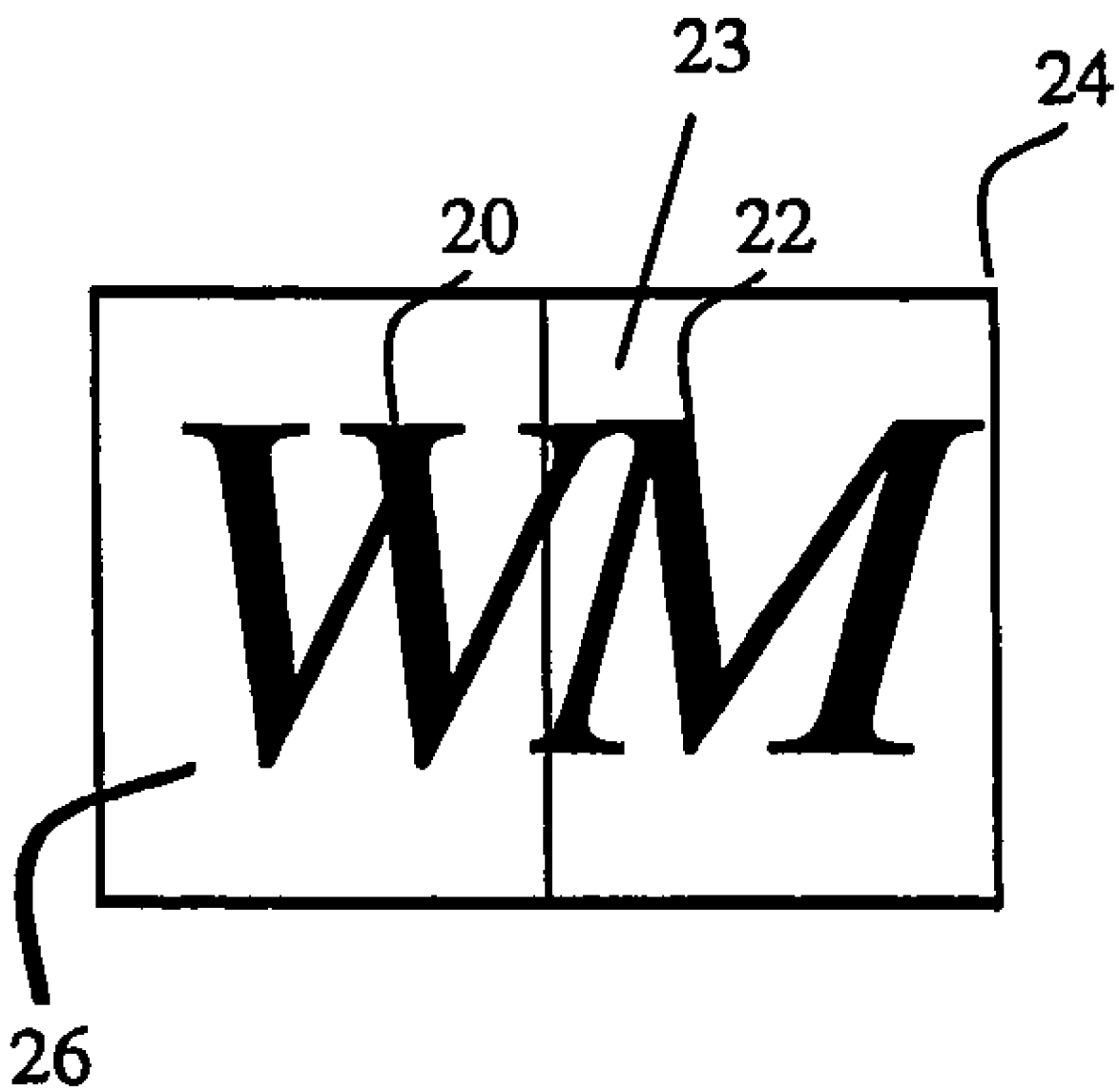
FIG. 3 illustrates two adjacent text characters having distortions caused by rendering of italicized characters corrected using the system and method of the present invention.

An exemplary embodiment of a system and method for solving the problem described above is now described with reference to FIGS. 1, 2 and 3. FIG. 1 illustrates the progression for correcting character distortions followed by the system and method of the present invention. FIG. 2 illustrates a flowchart of a correction routine 30 in accordance with the system and method of the present invention. FIG. 3 illustrates two adjacent text characters having distortions caused by italicization corrected by the system and according to the method of FIG. 2. When text is to be displayed, a signal indicative of a foreground and background of a first character 20 is generated for rendering on a display, as shown in FIG. 3 and discussed in step S30. In step S32 a signal indicative of a next or second character 22 including its foreground and background colors is generated for rendering adjacent the first character 20. In step S34 it is determined whether the previous or first character 20 immediately preceding the second character 22 is italicized. The location of the preceding character 20 is based on the direction in which the text is being rendered, e.g. left to right, right to left, up, down, etc.

If the first character 20 is italicized, then it is anticipated that rendering the background color for the current character has resulted in the portion 25 of the first character 20 protruding into cell area 24 of the next character 22 being obfuscated. The edge of the cell area 24 of the next character 22 intersects the protruding section 23 of the first character 22. In step S36, such obfuscation is corrected by generating a signal indicative of the foreground of the first character 20 without re-rendering its background 26 on a display. The generated signal indicative of the foreground of the first character 20 is then provided for re-rendering. It is understood that where the decision step S32 determines that the preceding character is not italicized, no corrective action needs to be taken. The method then continues by generation of a signal indicative of the foreground and background of a subsequent adjacent character for rendering on a display. The next character 22 is then treated as the first character 20 this process continues until all text has been displayed.

More specifically, with regard to the example illustrated in FIG. 3, the system detects that the "W" character 20 is italicized and, therefore, a top right portion 23 of the character will be obscured by the subsequent adjacent "M" character 22 when displayed. The correction routine 30 controls rendering the "M" character 22 and then re-rendering the foreground "W" character 20 without re-rendering the background color of the cell area 26 associated with the "W" character 20. The inventive correction routine 30 enables parsing and display of one character at a time, preventing corruption or obfuscation of the graphical rendition of italicized or tilted letters that protrude into the adjacent character's cell area.

Replacing the Character

Figure 4:
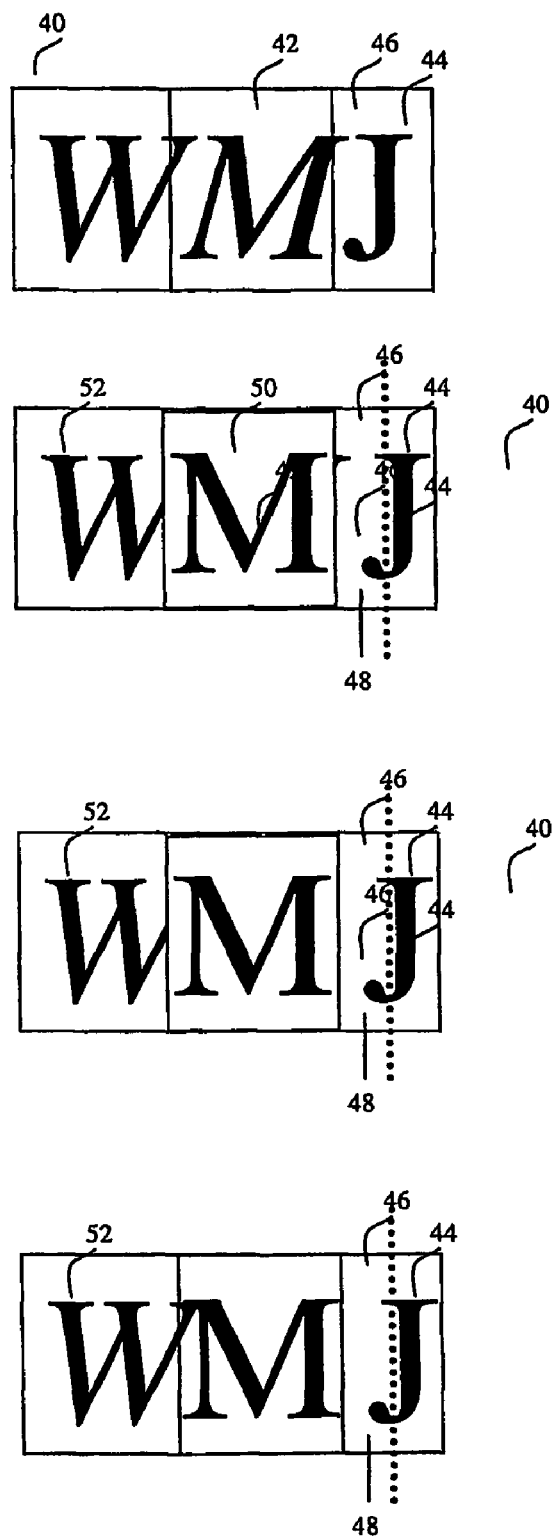
FIG. 4 is a block diagram showing distortions caused by the replacement of italicized characters in the close caption text and the correction thereof in accordance with an alternate embodiment of the system and method of the present embodiment.

An alternate embodiment of the present invention involves replacing characters on a display. Characters rendered on displays that are EIA-608 and/or EIA-708 compliant can be modified. A character may be modified for any of numerous reasons such as incorrect rendering of a character, correcting a misspelling, etc. Replacement of a character requires replacing an already rendered character in an existing stream. For example, as shown in FIG. 4, the progression 40 of replacing a previously rendered italicized character "M" 42 with a non-italicized character "M" 42 is shown.

As can be seen from this figure, first, it is determined whether the character "M" 42 is italicized. If this character is determined to be italicized, the immediately following character, the "J" character 44 in this instant, must be re-rendered to remove any distortion that might remain in the background 46 of the "J" character 44 caused by the italicized character "M" 42. The inventive solution lies in generating a signal representative of the background 46 and foreground colors of the "J" character 44 and re-rendering the background 46 and foreground colors of the "J" character 44.

The present inventions saves time by causing re-rendering of only the left half of the foreground and background of the adjacent cell to the right of the replaced character, in this instance italicized character "M" 42. Illustratively, the re-rendering of the adjacent cell re-renders ½ the width portion 48 of the "J" character 44 defined to the left of the dotted line. Alternatively, any portion of the adjacent cell may be re-rendered. Re-rendering of the adjacent cell is not limited to ½ the cell width. Furthermore, for other languages such as Hebrew, which is read from right to left, the rendering and re-rendering of cells are performed in a direction opposite that described herein.

Updating only half of the adjacent cell prevents the cascading effect of fix-ups that may be required for characters that follow the adjacent cell. The cascading effect is created when re-rendering the whole of character 42 may overflow onto and obscure the character that follows if character 42 is italicized. This will require the character 44 that follows character 42 to be fixed, and so on.

After the correction of the character 44 following the character being replaced 42, the new character 50 is rendered and the character 52, preceding the new character 50, is checked to determine if it is italicized. As discussed above the preceding italicized character may be obscured when the following character is rendered and therefore its foreground, i.e., the letter, is re-rendered as shown to assure that the new character does not obscure it.

Figure 5:
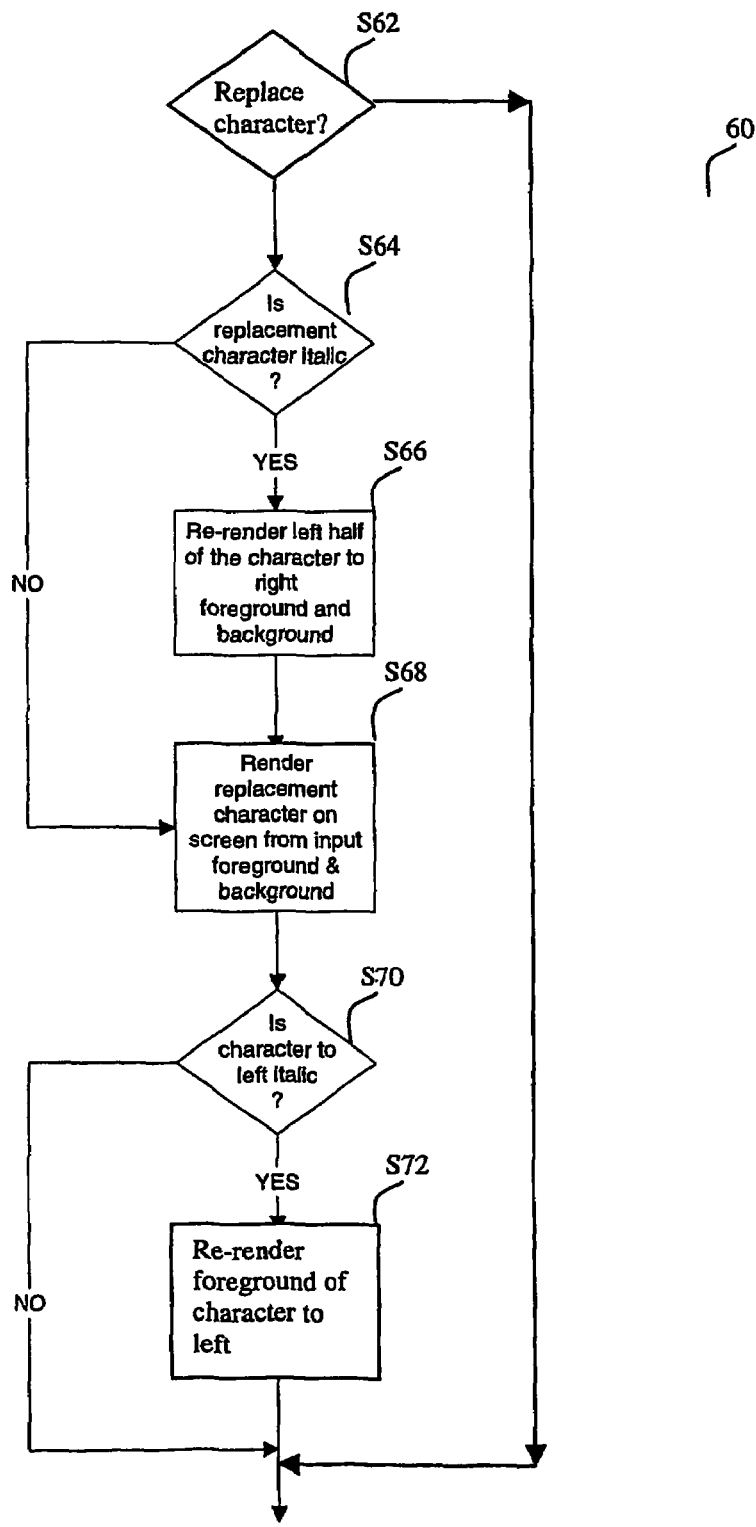
FIG. 5 is a flowchart describing the steps of replacement of italicized characters in the close caption text in accordance with the system and method of the present invention.

FIG. 5 illustrates an inventive correction routine 60 that performs character replacement as discussed above in FIG. 4.

In step S62 a determination is made whether a character is to be replaced. If a character is not to be replaced, the display of characters continues according to the display process implemented. If it is determined a character, e.g. the replacement character 42 illustrated in FIG. 4, is to be replaced, it is determined if the character is italicized in step S64. If the character, in step S64 is determined to be italicized a signal representative of the background and the foreground of the adjacent half of the cell following the replacement character 42 is generated and re-rendered as discussed in step S66. If the character to be replaced is determined in step S64 not to be italicized, a signal representative of the background and the foreground of the replacement character e.g. character 50 shown in FIG. 4, is generated and rendered on the screen as stated in step S68.

In step S70, a determination whether the character 52 to the left of the re-rendered character 50 is italicized is made. If the determination is in the affirmative, a signal representative of the foreground of that character is generated and re-rendered in step S72 in a manner similar to that described with reference to FIG. 3.

Figure 6:
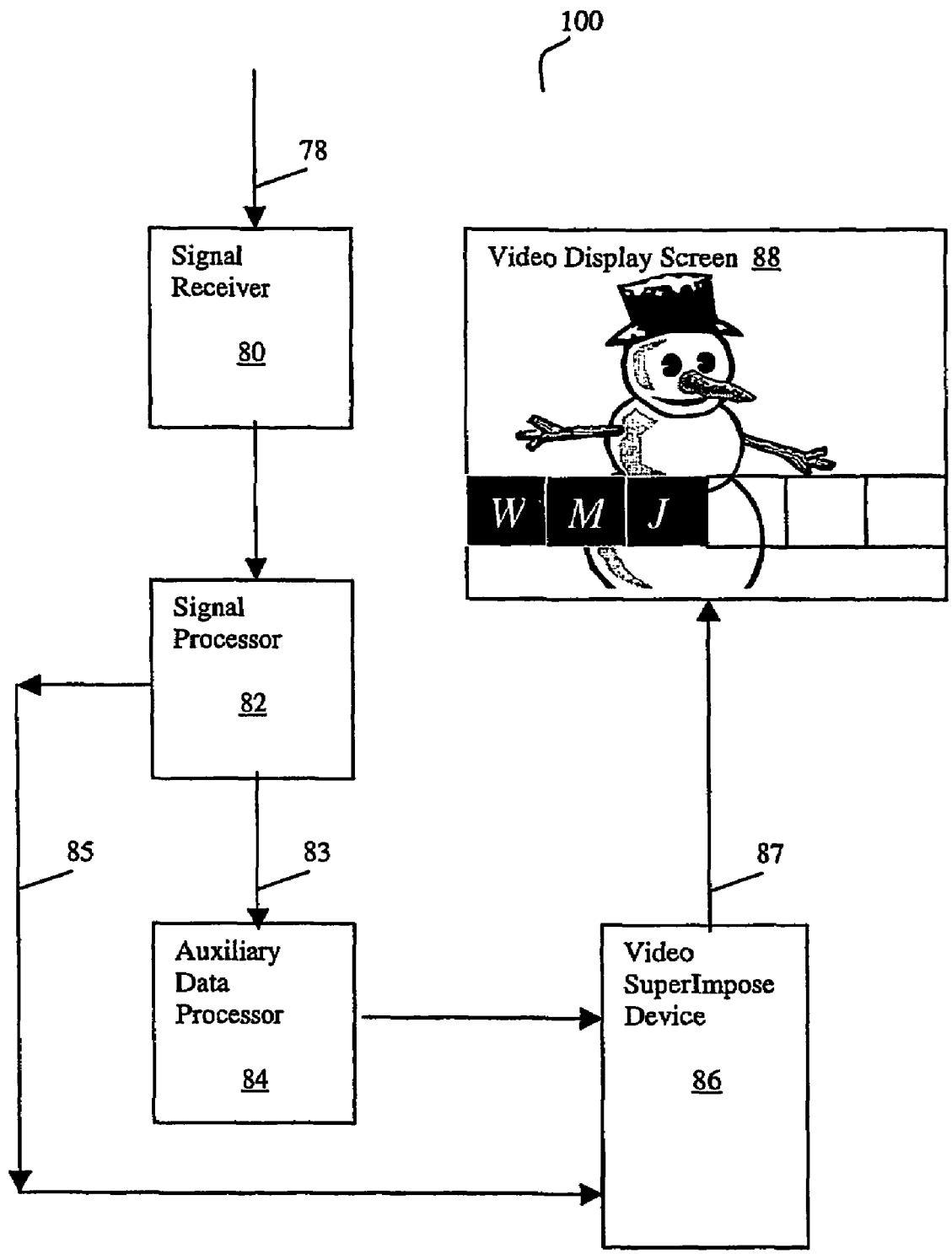
FIG. 6 is a block diagram showing the system of the present invention used for correcting distortions caused by italicized characters displayed as part of the close caption text.

In one illustrative embodiment shown in FIG. 6, the inventive system 100 includes a receiver 80 for receiving a video signal 78. The received video signal 78 is forwarded to a signal processor 82. The received video signal 78 includes an image signal and an auxiliary data signal. The auxiliary data signal may include data such as close caption data to be superimposed on the video signal.

The signal processor 82 extracts the auxiliary data signal and processes the video signal. The video signal is then passed to the video superimpose device 86. If the signal processor 82 detects auxiliary data encoded in the video signal, the auxiliary data 83 will be separated from the video signal and forwarded to an auxiliary data processor 84. The auxiliary data processor 84 decodes the components of the auxiliary data signal 83. The components of the auxiliary data signal include at least characters for display or to be superimposed on a video signal, the position at which the characters are to be superimposed on the video signal, and a font and font style of the characters. The decoded components of the auxiliary data signal are then provided to the video superimpose device 86 for combining the video signal and the auxiliary data signal to form a composite signal. The superimpose device 86 may be connected to a video screen 88 as shown for display of the composite signal.

The caption characters can be displayed in any position on display screen 88 defined by the auxiliary data signal. Each character of the data is generally displayed with a white foreground color, e.g., letter color, inside a black box as a background. However, any desired foreground and background colors may be used to display.

When displaying characters on the display screen, the superimpose device 86 checks the characters to determine if the characters are italicized and then corrects the display of the characters in accordance with the method described herein before with reference to FIG. 1-5.

The video screen 88 may be combined with the system of the present invention such as in a television set. Alternatively, the system can operate as a set top box processing the auxiliary data signals for providing the signals to a separate display device for display of the composite signal including the auxiliary data.

From the above description it can be seen that the system of the present invention is able to overcome the shortcomings of prior art by providing a system and method of replacing characters and correcting the display of text rendered in auxiliary information processing systems, e.g., close caption systems, where italicized characters are generated for display sequentially on a video display apparatus. The inventive method generates a signal indicative of the background and foreground colors of a next character and then re-renders only the foreground color of the adjacent preceding character. Such is performed upon determining if the preceding adjacent character is rendered in an italicized form.

The invention is further able to perform replacement of a previously rendered character. First, the invention generates a signal indicative of the background and foreground colors of an adjacent character and re-renders the foreground and background colors of the adjacent character rendered after the character to be replaced. Preferably, only an adjoining portion of the subsequent adjacent character is re-rendered. Then, a signal indicative of the background and foreground colors of a new character are generated and rendered to overwrite the character to be replaced. If the italicized character immediately preceding the replaced character is obscured, only the foreground of the preceding character is re-rendered to correct the text.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

The invention claimed is:

1. A method of correcting distortion of characters represented by data included in an auxiliary data signal received with a video signal, the method comprising the steps of:
    providing a signal representing a background and a foreground of a first character; rendering a background and a foreground of the first character;
    providing a signal representing a background and a foreground of a second subsequent character adjacent the first character; rendering a background and foreground of the second subsequent character;
    determining if said first character is rendered in italics; and
    re-rendering a foreground color of the first character upon determining said first character is italicized.

2. The method of claim 1, further comprising the step of providing said first and second characters for display on a display screen.

3. The method of claim 1, wherein the characters are displayed in accordance with at least one of an EIA-608 and EIA-708 standard.

4. A method of replacing characters represented by data included in an auxiliary data signal, the method comprising the steps of:
    determining if a first character is rendered in italics; providing a signal representing a background and a foreground of at least a portion of a second subsequent character;
    re-rendering a foreground color and a background color of at least a portion of the second subsequent character adjacent the first character upon determining the first character is italicized;
    providing a signal representing a background and a foreground of a replacement character; and
    rendering the foreground color and the background color of the replacement character superimposing the first character.

5. The method of claim 4, further comprising the steps of:
    providing a signal representing a background and a foreground of the first character;
    rendering a background and a foreground of said first character;
    providing a signal representing a background and a foreground of the second subsequent character; and
    rendering a background and foreground of the second subsequent character.

6. The method of claim 4, wherein said re-rendering step is performed only when said character to be replaced is italicized.

7. The method of claim 4, further comprising the step of determining if a character adjacent the replacement character on a side opposite the second character is italicized.

8. The method of claim 7, further comprising the steps of providing a signal representing a foreground of the adjacent character; and re-rendering a foreground color of said adjacent character when the adjacent character is determined to be italicized.

9. The method of claim 4, wherein said step of re-rendering re-renders at most one half of the foreground and background color of the second subsequent character adjacent to the replacement character.

10. The method of claim 4, further comprising the step of providing said characters for display on a display screen.

11. The method of claim 10, wherein the characters are displayed in accordance with at least one of an EIA-608 and EIA-708 standard.

12. The method of claim 10, wherein the display screen is a monitor of a computing device.

13. An apparatus for correcting distortion of characters represented by data, the apparatus comprising:
    means for receiving a signal, including auxiliary information having character data; means for extracting the auxiliary information and character data from said signal;
    means for processing said character data wherein said character data includes a plurality of characters represented by a background color and a foreground color and said processing means determines if each of said plurality of characters displayed is italicized, generates a signal indicative of the foreground color of each of said plurality of characters and re-renders a foreground color of each of said plurality of characters determined to be italicized after rendering of a subsequent adjacent one of said plurality of characters.

14. The apparatus of claim 13, wherein said character data represents closed caption data.

15. The apparatus of claim 13, wherein said received signal includes an image signal and said processing means combines said image signal with said plurality of characters for producing a composite signal representing said plurality of characters superimposed on said image signal.

* * * * *